US012241792B2

(12) United States Patent
Duncan et al.

(10) Patent No.: US 12,241,792 B2
(45) Date of Patent: Mar. 4, 2025

(54) PELLET MILL ROLL TEMPERATURE SENSING

(71) Applicant: ANDRITZ INC., Alpharetta, GA (US)

(72) Inventors: Timothy Edward Duncan, Alpharetta, GA (US); Benjamin Michael Schappell, Alpharetta, GA (US); Fred Matthew Delany, Alpharetta, GA (US)

(73) Assignee: ANDRITZ INC., Alpharetta, GA (US)

( * ) Notice: Subject to any disclaimer, the term of this patent is extended or adjusted under 35 U.S.C. 154(b) by 248 days.

(21) Appl. No.: 17/797,031

(22) PCT Filed: Mar. 11, 2021

(86) PCT No.: PCT/US2021/021865
§ 371 (c)(1),
(2) Date: Aug. 2, 2022

(87) PCT Pub. No.: WO2021/194753
PCT Pub. Date: Sep. 30, 2021

(65) Prior Publication Data
US 2023/0067012 A1   Mar. 2, 2023

Related U.S. Application Data

(60) Provisional application No. 62/994,144, filed on Mar. 24, 2020.

(51) Int. Cl.
*G01K 1/14* (2021.01)
*B29B 9/06* (2006.01)
(Continued)

(52) U.S. Cl.
CPC .................. *G01K 1/14* (2013.01); *B29B 9/06* (2013.01); *B29C 48/0022* (2019.02);
(Continued)

(58) Field of Classification Search
None
See application file for complete search history.

(56) References Cited

U.S. PATENT DOCUMENTS

2012/0189726 A1   7/2012   Udink et al.
2012/0211914 A1   8/2012   Walker
(Continued)

FOREIGN PATENT DOCUMENTS

CN      201989211 U       9/2011
CN      210484432 U   *   5/2020   ............. F16C 37/00
(Continued)

OTHER PUBLICATIONS

International Application No. PCT/US2021/021865, International Search Report and Written Opinion, Jun. 16, 2021, 13 pages.
(Continued)

*Primary Examiner* — Robert J Grun
(74) *Attorney, Agent, or Firm* — Kilpatrick Townsend & Stockton LLP

(57) ABSTRACT

A roll assembly temperature sensing system for a pellet mill includes: a thermal sensor (160); and a pellet mill roll assembly rotatably disposed in a rotor assembly. The pellet mill roll (140) assembly includes: a roll shaft; a bearing disposed circumferentially around the roll shaft; and a seal (150) disposed between an end of the bearing and the rotor assembly. The rotor assembly includes an area defining a die cavity adjacent to the seal (150). The thermal sensor (160) is disposed within the die cavity, and is configured to detect a temperature of the seal resulting from heat conducted from the bearing.

19 Claims, 9 Drawing Sheets

(51) Int. Cl.
    *B29C 48/00*     (2019.01)
    *B29C 48/05*     (2019.01)
    *B29C 48/92*     (2019.01)
    *B30B 11/20*     (2006.01)
    *B30B 15/14*     (2006.01)
    *G01K 1/024*     (2021.01)

(52) U.S. Cl.
    CPC .............. *B29C 48/05* (2019.02); *B29C 48/92* (2019.02); *B30B 11/201* (2013.01); *B30B 15/148* (2013.01); *G01K 1/024* (2013.01); *B29C 2948/92209* (2019.02)

(56) References Cited

U.S. PATENT DOCUMENTS

2013/0283928 A1     10/2013     Wiklund

2017/0219152 A1     8/2017     Petrou et al.

FOREIGN PATENT DOCUMENTS

DE          102010039457 A1     2/2012
JP           2002283346 A       10/2002

OTHER PUBLICATIONS

European Patent Application No. EP21715728.8, Office Action mailed on May 2, 2024, 4 pages.
Canadian Application No. 3,168,162, Office Action mailed on Oct. 24, 2023, 3 pages.
European Application No. 21715728.8, Intention to Grant mailed on Dec. 6, 2023, 9 pages.
PCT Application No. PCT/US2021/021865, International Preliminary Report on Patentability mailed on Oct. 6, 2022, 9 pages.

\* cited by examiner

| Detected Temperature Conditions | Possible Actions | | | | | | | Suggested Actions When Alarm Sounds | | | | | |
|---|---|---|---|---|---|---|---|---|---|---|---|---|---|
| | Add Grease | Purge Grease | Add Water to Die Cavity | Add Water to Feedstock | Increase Feed Rate | Decrease Feed Rate | Trigger Alarm | Check Roll-Die Clearance | Replace Roll Assy | Inspect Die Cavity | Review Feedstock Parameters | Check Sensor Conn. | Shut Down Pellet Mill |
| 1 Roll Assembly Reaches High Temp | 1 | 2 | | | | | 3 | | | X | | | |
| 1 Roll Assembly Temp Rises Rapidly | | 1 | | | | | 2 | X | X | X | | | X |
| All Roll Assemblies Reach High Temp | 1 | 4 | | 3 | | 2 | 5 | | | X | X | | X |
| All Roll Assemblies Temps Rise Rapidly | | 1 | | 2 | | 1 | 2 | X | | X | X | | |
| 1 Roll Assembly Temp Drops Slowly | | | | | 2 | | 1 | X | | X | | | |
| 1 Roll Assembly Temp Drops Rapidly | | | | | 2 | | 1 | X | | X | | X | |
| Roll Assembly Temp Increase & Mill Overcurrent | | 1 | | 3 | | 2 | 3 | X | | X | X | | |
| Wide Temp Difference Between Roll Assemblies | | | | | | | 1 | X | X | | X | | |
| Roll Assembly Temp > Feedstock Ignition Temp | | | 1 | | | | 1 | | X | | | X | X |
| 1 Roll Assembly Temp > Avg Over Extended Time | 1 | 2 | | | | | 3 | X | X | X | X | X | |
| All Roll Assemblies Temps > Avg Over Extended Time | 1 | 2 | | | | 3 | 4 | X | | X | X | | |

FIG. 8

PELLET MILL ROLL TEMPERATURE SENSING

CROSS-REFERENCES TO RELATED APPLICATIONS

This application claims the benefit of U.S. Provisional Application No. 62/994,144, filed Mar. 24, 2020, titled Pellet Mill Roll Temperature Sensing, the content of which is hereby incorporated herein by reference in its entirety.

BACKGROUND

Unless otherwise indicated herein, the materials described in this section are not prior art to the claims in this application and are not admitted to be prior art by inclusion in this section.

Pellet mills extrude feed material (e.g., typically biomass or grains) through a die and into pellets. Pellet mills are used in a variety of industries, including livestock industry, thermal energy industry, plastics, and wood composites industries.

A pellet mill typically comprises two or three pellet mill roll assemblies that are rotatably engaged to a stationary rotor in a planetary gear arrangement. Generally, the rotor remains stationary while the peripheral pellet mill rolls rotate within a chamber. Rotation of the pellet mill rolls is caused by friction created between a driven die that encircles the mill roll and rotor assembly and the feed material being pelleted. Feed material typically enters the chamber through an inlet. As the mill rolls rotate within the rotor and along the inner circumference of the die, the pellet mill roll assembly collects feed material between the mill roll outer surface and the inner circumference of the die and extrudes the feed material through the die. The extruded feed material then encounter a knife or doctor blade on the outer circumference of the die. The knife cuts the extruded feed material to form pellets. These pellets are then collected from the pellet mill and are typically sent down a production line for further processing.

Further processing can typically include cooking and/or drying the pellets to impart desirable physical or chemical properties. For example, the livestock feed industry typically cooks these animal feed ingredients to help the pellets retain their shape and to extend the shelf life of the feed pellets. As another example, biomass pellets destined for thermal energy plants are sometimes dried and heated in reduced oxygen environments (e.g., they undergo torrefaction) to increase the energy density within the biomass pellets.

The pellet milling process exposes the equipment and the feed material to high friction and high heat, particularly as plant operators seek to increase production by increasing the rate at which the mill pushes the feed material through the die. The risk of equipment damage due to excessive heat is especially elevated when the feed material is dry biomass.

Previous attempts to address this problem utilized wireless sensors and transmitters placed proximate to the pellet mill roll assemblies. However, such solutions were costly. Further, the sensors typically suffered from low battery life, requiring frequent production interruptions to replace the expired batteries, thereby compounding annual production loss. Even when the sensors were functional, their required placement within the chamber often interfered with feed material distribution. In addition, stainless steel pellet mill housings interfered with the transmission of the wireless signal to a receiving computer. Also, the receiving computer was dedicated to the wireless transmitter and could not be integrated directly into the plant control system (e.g., a programmable logic controller ("PLC") or a distributed control system ("DCS")).

Another previous solution used thermal sensors and a junction box mounted in front of the pellet mill roll assemblies. This solution offered a simplistic approach that was more compatible with plant control systems. However, placement of the thermal sensors and junction box in front of the pellet mill roll assemblies required that the temperature measurement system be removed prior to replacing the mill rolls, thereby extending pellet mill downtime and annual production loss. In addition, the sensor placement required disconnecting electrical wires thereby exposing potential live electricity to a hazardous dust environment in the pellet mill die cavity if power was not properly disconnected and locked out. Furthermore, thermal sensors located in the production area were prone to breakage. Not only were broken sensors useless for detecting excessive bearing heat, but the broken pieces of the sensors frequently contaminated the pellets, thus further exacerbating production loss. Additionally, the thermals sensors were not in contact with the bearing of the pellet mill roll assembly. As a result, the temperature sensors suffered from delayed temperature spike detection. Delayed detection of temperature spikes often cascaded into a delayed and inadequate response.

SUMMARY

The present disclosure relates generally to sensing the temperature of industrial equipment and more particularly, but not exclusively, to a system for sensing the temperature of rolls in a pellet mill.

According to various aspects there is provided a roll assembly temperature sensing system for a pellet mill. In some aspects, the roll assembly temperature sensing system may include: a thermal sensor; and a pellet mill roll assembly rotatably disposed in a rotor assembly. The pellet mill roll assembly may include: a roll shaft; a bearing disposed circumferentially around the roll shaft; and a seal disposed between an end of the bearing and the rotor assembly. The rotor assembly may include an area defining a die cavity adjacent to the seal. The thermal sensor may be disposed within the die cavity, and may be configured to detect a temperature of the seal resulting from heat conducted from the bearing.

According to various aspects there is provided a temperature sensing system. In some aspects, the temperature sensing system may include: a rotor assembly disposed in a milling chamber of a pellet mill. The rotor assembly may include: a cavity configured to accommodate a thermowell assembly; and a portion configured to accommodate a roll assembly configured to rotate within the milling chamber. The roll assembly may include: a pellet mill roll; a bearing configured to support the pellet mill roll on a roll shaft; and a seal disposed between the bearing and the portion of the rotor assembly configured to accommodate a roll assembly. The temperature sensing system may further include a thermal sensor disposed in a thermowell. The thermowell may be in contact with the seal. The thermal sensor may be configured to detect a temperature of the seal resulting from heat conducted from the bearing.

According to various aspects there is provided a method for sensing a temperature of a roll assembly for a pellet mill. In some aspects, the method may include instructions for causing one or more processors to perform operations including: receiving, by a controller, signals from a thermal sensor disposed in a cavity in a rotor assembly of a pellet mill. The thermal sensor may sense a temperature of a seal in contact with a bearing of the roll assembly. The operations may further include converting, by the controller, the signals received from the thermal sensor to temperature values; and comparing the temperature values to a threshold value. In response to determining that the temperature values exceed the threshold value, the operations may further include generating, by the controller, a notification on a display device, and automatically performing an operation intended to decrease the temperature value.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

FIG. 8 is a spreadsheet showing examples of possible actions that may be taken based on detected temperature conditions according to some aspects of the present disclosure.

DETAILED DESCRIPTION

Figure 1:
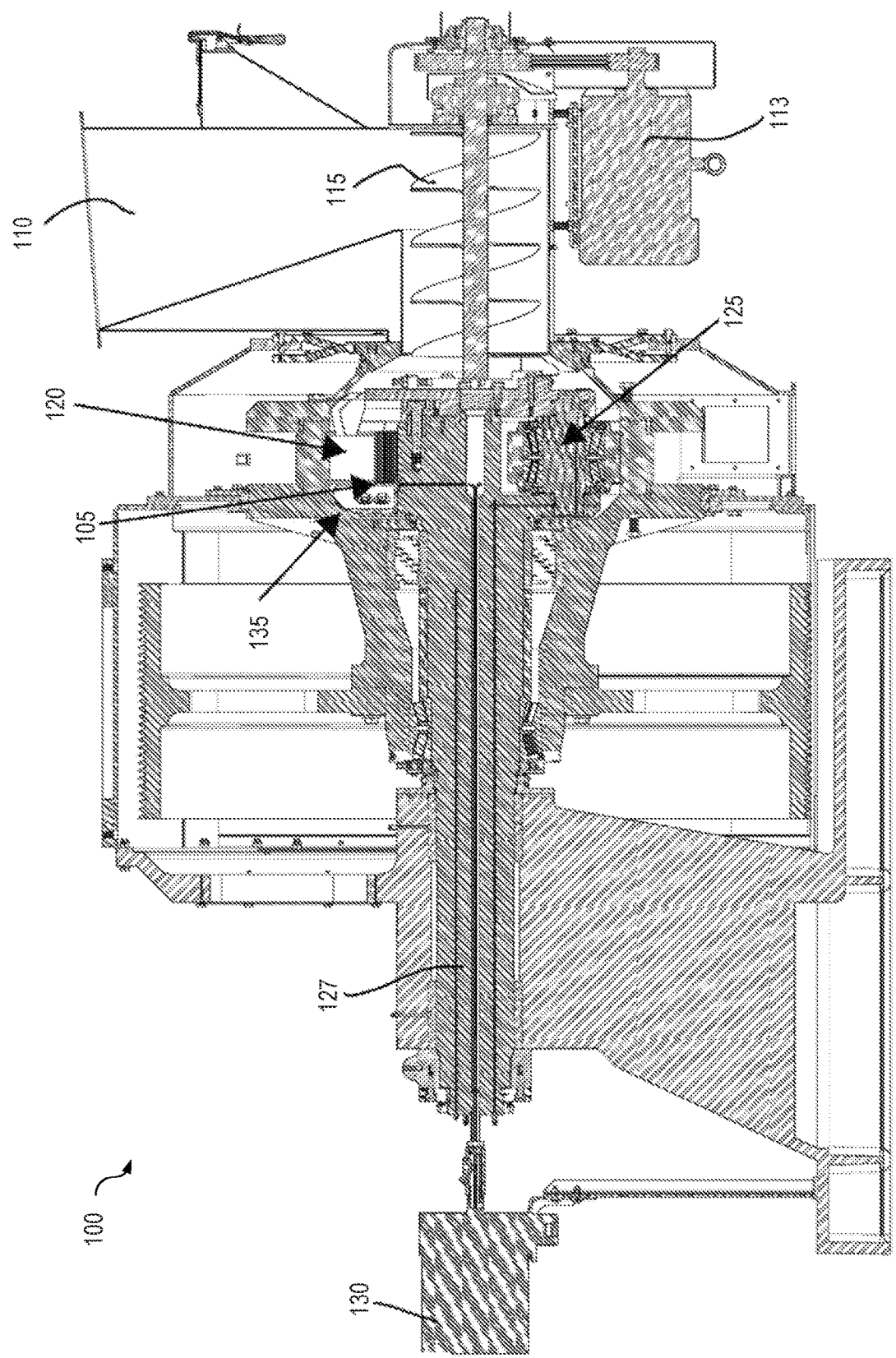
FIG. 1 is a cross-sectional side view of an exemplary pellet mill including an example of a pellet mill roll temperature sensing system according to some aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The following detailed description of the preferred embodiments is presented only for illustrative and descriptive purposes and is not intended to be exhaustive or to limit the scope and spirit of the invention. The embodiments were selected and described to explain the principles and practical applications. Many variations can be made to the embodiments disclosed in this specification without departing from the scope of protection.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the states value by less than the experimental error of conventional measurement technique of the type described in the present application to determine the value.

All ranges disclosed herein are inclusive of the recited endpoint and are independently combinable (for example, the range "212° F. to 1300° F." is inclusive of the endpoints, 212° F. and 1300° F., and all intermediate values.

As used herein, approximating language may be applied to modify any quantitative representation that may vary without resulting in a change in the basic function to which it is related. Accordingly, a value modified by a term or terms, such as "about," "approximately," and "substantially," may not be limited to the precise values specified. The modifier "about" should also be considered as disclosing the range defined by the absolute values of the two endpoints. For example, the expression "from about 212° F. to about 1300° F." also discloses the range "from 212° F. to 1300° F."

The terms "horizontal" and "vertical" are used to indicate direction relative to an absolute reference, e.g., ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, e.g., the surface of the earth. The terms "upwards" and "downwards" are also relative to an absolute reference; an upwards flow is always against the gravity of the earth.

The term "directly," where used to refer to two system components, such as valves or pumps, or other control devices, or sensors (e.g., temperature or pressure), may be located in the path between the two named components.

FIG. 1 is a cross-sectional view of an exemplary pellet mill 100 having an exemplary pellet mill roll temperature sensing system 105 according to some aspects of the present disclosure. A pellet mill 100 is configured to increase the density of a feed material by extruding the feed material through a die to form pellets. The pellet mill 100 may include a hopper 110 for holding undensified feed material. Examples of feed material may include lignocellulosic material, or other carbohydrate-containing materials, such as purified cellulosic material. Feed material may alternatively include mineral suspensions, including clay, sludge, and other partially dried solids.

The hopper 110 may communicate with an auger 115 that can be driven by constant speed motor 113. The speed of the auger 115 may be adjusted by a variable V-belt drive (not shown). In this manner, the undensified material can be transported to the milling chamber. In some pellet mills, the undensified feed material may move through a conditioner prior to entering the milling chamber 133 (see FIG. 2). A conditioner may include several paddles that mix any additives or fillers into the feed material prior to milling.

The milling chamber 133 is bounded by a cylindrical die having a plurality of radially extending die holes. The cylindrical die rotates about a horizontal axis as the undensified feed material enters the milling chamber 133. One or more pellet mill roll assemblies 125 is rotatably engaged to the rotor assembly 135. The pellet mill roll assemblies 125 may be disposed in the rotor assembly 135 to resemble a planetary gear. That is, the pellet mill roll assembles 125 are rotatably disposed in the rotor assembly 135 such that a portion of the outer surface of the pellet mill roll assemblies 125 continuously abuts an inner circumference of a cylindrical die as the cylindrical die rotates around the rotor assembly 135. The pellet mill roll assemblies may be referred to herein as "roll assemblies" or in the singular as a "roll assembly."

The rotating roll assemblies 125 collect undensified feed material in the milling chamber 133 and extrude some of the feed material through the radially extending die holes. The extruded feed material may extend radially from the outer circumferential surface of the cylindrical die. As the cylindrical die rotates, the extruded feed material may eventually encounter a doctor blade or other shear knife that shears the pellet from the cylindrical die. These pellets are then collected for further processing.

After extrusion, the feed material is conveniently in the form of pellets or chips having a variety of shapes. In some embodiments, the pellets or chips are cylindrical in shape, e.g., having a maximum transverse dimension of, for example, 1 mm or more, e.g., 2 mm, 3 mm, 5 mm, 8 mm, 10 mm, 15 mm or more, e.g., 25 mm. Other convenient shapes include pellets or chips that are plate-like in form, e.g., having a thickness of 1 mm or more, e.g., 2 mm, 3 mm, 5 mm, 8 mm, 10 mm or more, e.g., 25 mm; a width of, e.g., 5 mm or more, e.g., 10 mm, 15 mm, 25 mm, 30 mm or more, e.g., 50 mm; and a length of 5 mm or more, e.g., 10 mm, 15 mm, 25 mm, 30 mm or more, e.g., 50 mm.

Figure 2:
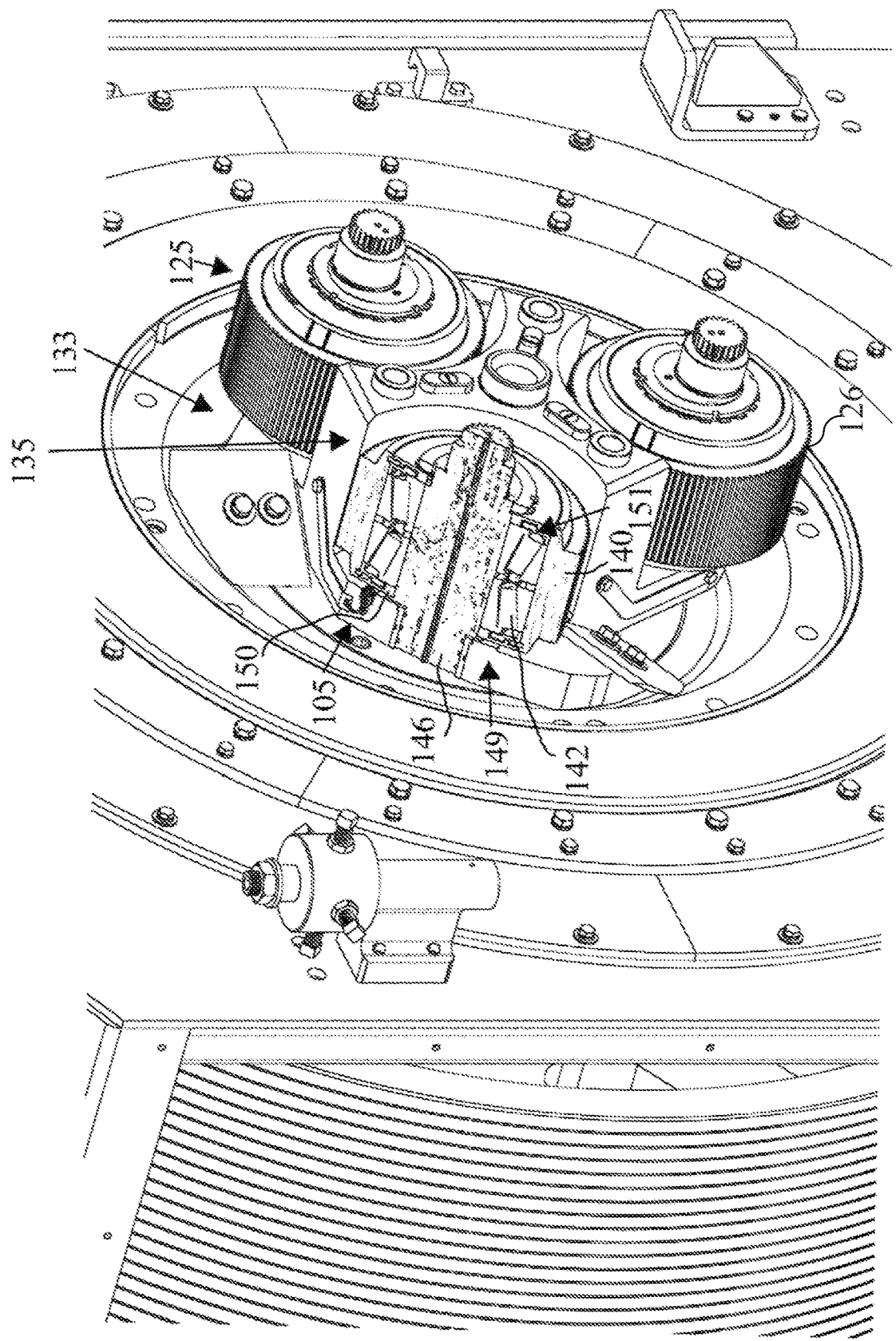
FIG. 2 is a perspective view of an exemplary pellet mill including an example of a pellet mill roll temperature sensing system illustrating one of the pellet mill roll assemblies and part of the rotor assembly in cross-section showing a thermal sensor of the pellet mill roll temperature sensing system according to some aspects of the present disclosure.

FIG. 2 is a perspective view of an exemplary pellet mill 100 including an example of a pellet mill roll temperature sensing system 105 illustrating one of the roll assemblies 125 and part of the rotor assembly 135 in cross-section showing a thermal sensor 160 (see FIG. 3) of the pellet mill roll temperature sensing system 105 according to some aspects of the present disclosure. In some implementations, multiple roll assemblies 125 may be rotatably disposed in the rotor assembly 135.

Referring to FIG. 2 the pellet mill roll temperature sensing system 105 may include a roll assembly 125 rotatably disposed in a rotor assembly 135. The roll assembly 125 may rotate in the milling chamber 133. The roll assembly 125 may include pellet mill roll 126, a roll shaft 146 and a bearing 142 circumferentially disposed around the roll shaft 146.

The bearing 142 may have a first end 149 and a second end 151 distally disposed from the first end 149, a roll sleeve 140 circumferentially disposed around the bearing 142, and a first seal 150 disposed at the first end 149 of the bearing 142 between the first end 149 of the bearing 142 and the rotor assembly 135. In some implementations, the first seal 150 may be constructed from a material having a higher thermal conductivity than 4140 alloy steel from which the roll shaft 146 may be constructed.

The rotor assembly 135 may include an area defining a die cavity 155 (see FIG. 3) adjacent to the first seal 150. A thermal sensor 160 may be disposed within the die cavity 155. The thermal sensor 160 may be configured to detect a temperature of the first seal 150. In some implementations, the thermal sensor 160 may be a resistance temperature detector (RTD). In some implementations, other types of thermal sensors, for example, but not limited to, thermocouples, thermistors, semiconductor sensors, etc., may be used.

Figure 3:
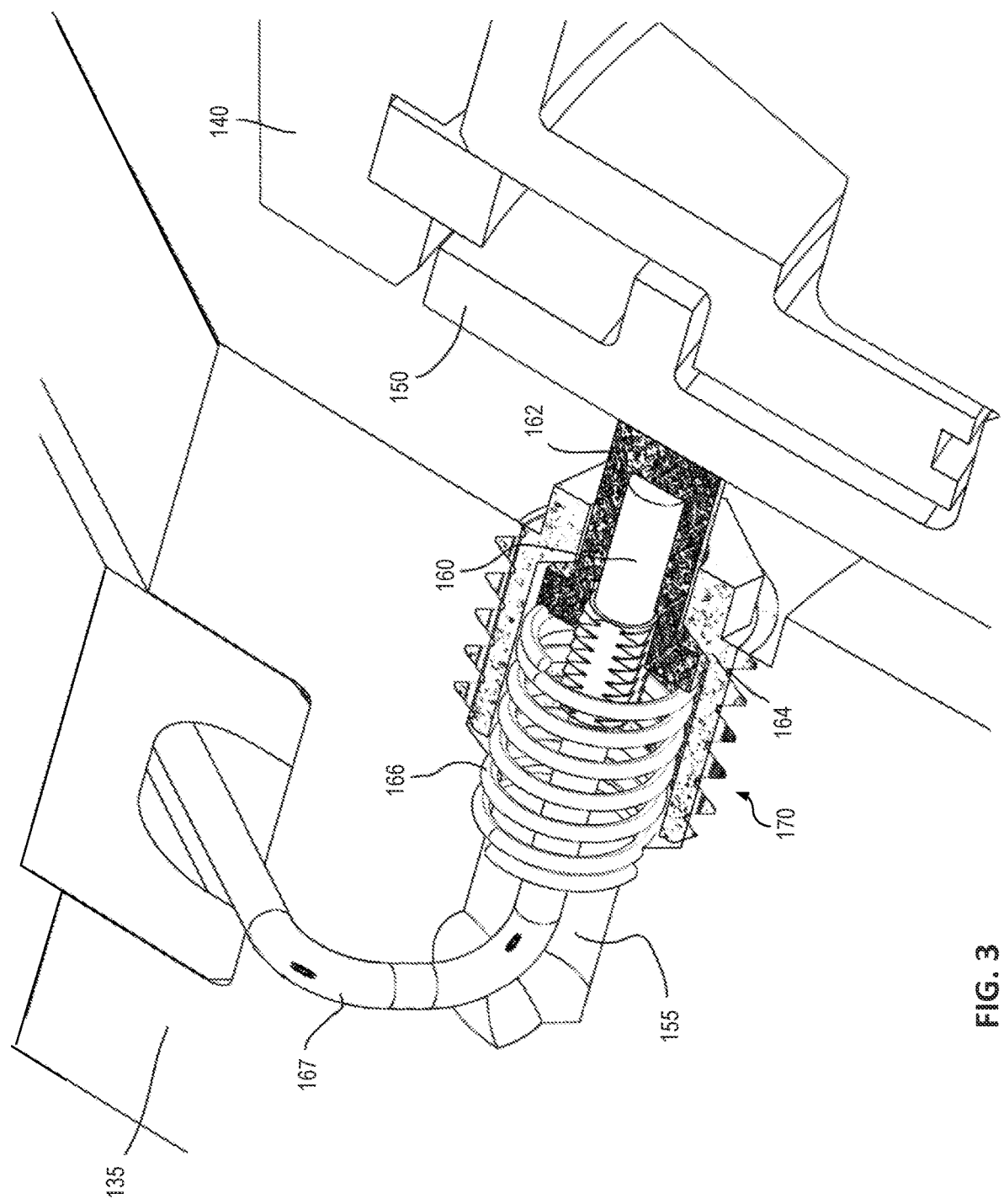
FIG. 3 is an enlarged view of the thermal sensor shown in FIG. 2 according to some aspects of the present disclosure.

FIG. 3 is an enlarged view of the thermal sensor 160 shown in FIG. 2 according to some aspects of the present disclosure. FIG. 3 illustrates the rotor assembly 135 having areas defining a die cavity 155. The rotor assembly 135 may have a die cavity 155 corresponding to each of the roll assemblies 125. The thermal sensor assembly may be disposed in the die cavity 155.

The thermal sensor 160 may be disposed in a spring-loaded thermowell assembly 170. The spring-loaded thermowell assembly 170 may include a spring 166 and a thermowell 162. The spring-loaded thermowell assembly 170 may be disposed in a housing 164 that may be disposed in the die cavity 155.

The thermal sensor assembly may include a wire 167 having a first end communicating with the thermal sensor 160. In some implementations, the wire 167 may have a first end in communication with the thermal sensor 160 and a second end in communication with a controller. The wire 167 may pass through the rotor assembly 135 and the main shaft 127 of the pellet mill 100. In some implementations, the wire 167 may have a second end disposed in a slip ring at a distal end of the pellet mill. The slip ring may be in electrical communication with a controller. In some implementations, the wire 167 may have a second end communicating with a wireless temperature transmitter.

The thermal sensors 160 may be disposed behind the roll assemblies 125 such that roll assembly maintenance will not affect the position or function of the thermal sensors 160. Such an arrangement may eliminate the need to disconnect wiring during roll assembly maintenance.

In some implementations, the first seal 150 may be a bronze labyrinth seal. In some implementations, a second seal may be distally located from the first seal 150. A bronze labyrinth seal 150 may have a higher thermal conductivity value than an alloy steel roll shaft.

According to aspects of the present disclosure, the thermal sensor 160 may be in direct thermal contact with the bronze labyrinth seal 150 of the roll assembly 125. The direct thermal contact may permit the thermal sensor 160 to detect changes in bearing temperature more quickly. In some conventional temperature sensing systems, a temperature sensor may sense the temperature rise of the roll shaft resulting from heating of the bearing. The exposed cross sectional area of the bronze labyrinth seal 150 may be larger than the exposed cross sectional area of the roll shaft 146. The larger exposed cross sectional area of the bronze labyrinth seal 150 may transmit more heat.

The rate of heat transfer (conduction) can be given by the formula:

$$\text{HEAT TRANSFER RATE} = K\,A(T1-T2)/d$$

Where:
K=thermal conductivity of material,
A=surface area,
T1=bearing temperature (during bearing failure),
T2=temperature in die cavity, and d=thickness of material.

Note: a higher heat transfer rate=quicker response of the thermal sensor 160 to detect potential bearing failures.

Examples of the rate of heat transfer (conduction) for a roll shaft constructed of 4140 alloy steel and a labyrinth seal constructed of SAE 660 bronze are provided below.

Example 1-4140 Alloy Steel Roll Shaft

Figure 4:
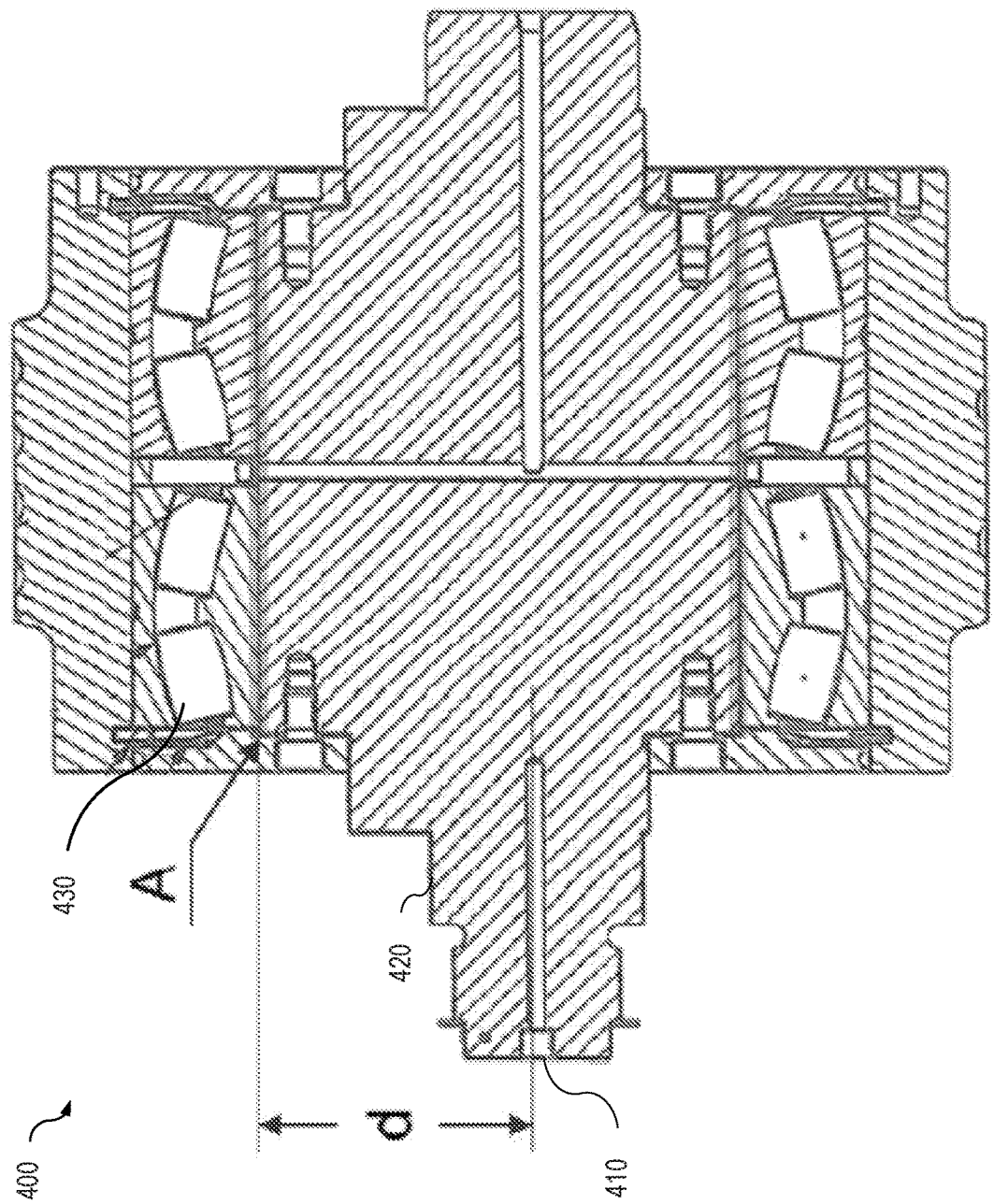
FIG. 4 is a cross-section of a pellet mill roll assembly and a conventional temperature sensing system for measuring the temperature of a steel roll shaft.

FIG. 4 is a cross-section of a pellet mill roll assembly 400 and a conventional temperature sensing system for measuring the temperature of the steel roll shaft. Referring to FIG. 4, the conventional temperature sensing system may utilize a thermocouple 410 to sense the temperature increase of the roll shaft 420 caused by the bearing 430. The heat transfer rate may be calculated as.

K=thermal conductivity of 4140 alloy steel (pellet mill roll shaft)=42.6 W/m ° C.
A=198.68 in$^2$ (=0.128 m$^2$)=area of roll shaft below bearings
T1=482° F. (=250° C.) wood flour ignition temperature from NFPA 499
T2=220° F. (=104° C.)=expected wood pelleting die cavity temperature
d=3.15 inch (=0.080 m)=distance from bearing to thermocouple
HEAT TRANSFER RATE=(42.6)(0.128) (250-104)/(0.08)=9,951 watts The heat transfer rate indicates that measuring the temperature increase of the steel roll shaft caused by heat generated by the bearing can result in slow response to an overheating bearing compared with the temperature sensing system of the present disclosure that measures the temperature increase of the roll bearing seal (e.g., the bronze labyrinth seal) as shown in Example 2 below.

Example 2—SAE 660 Bronze Labyrinth Seal

Figure 5:
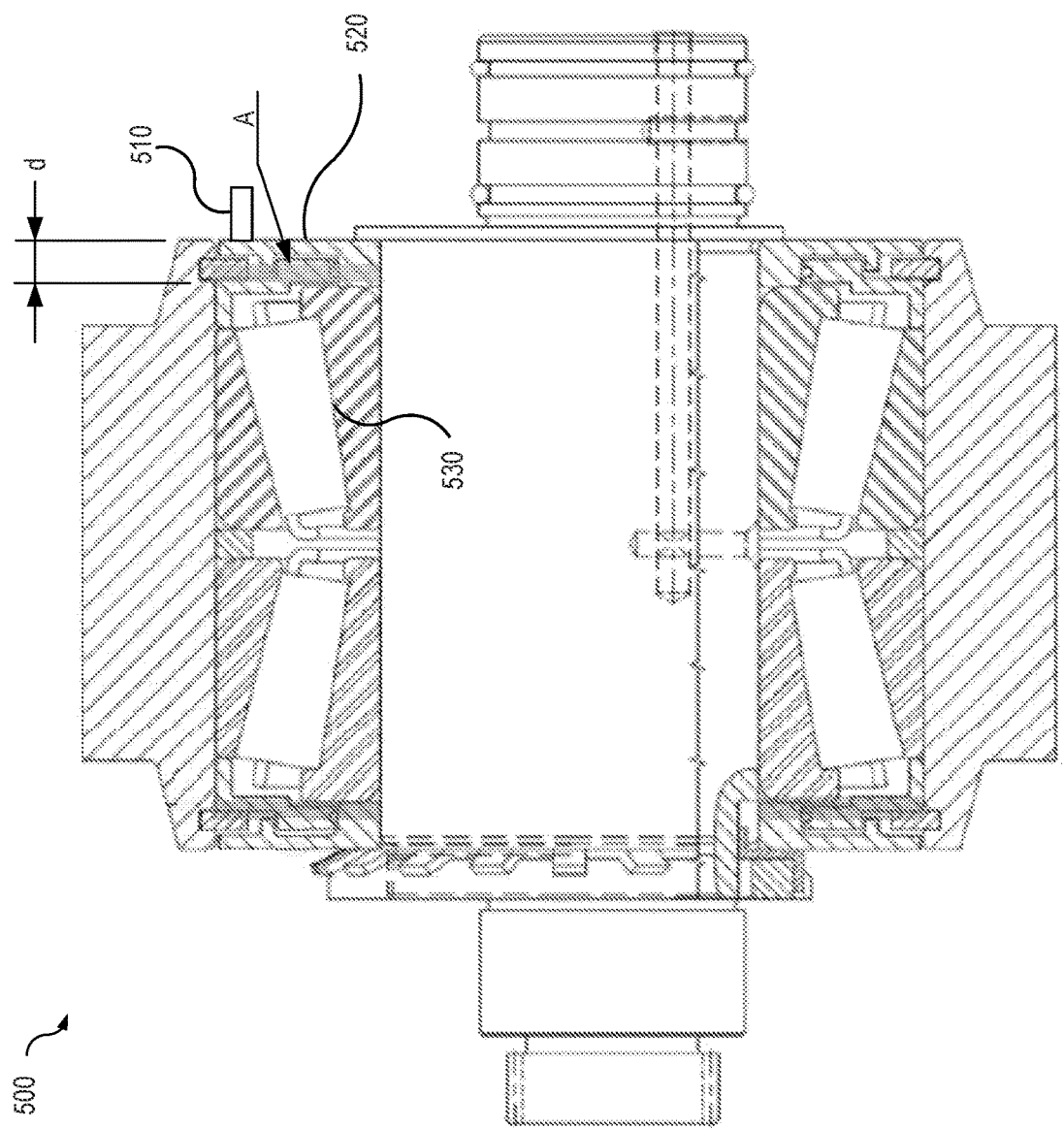
FIG. 5 is a cross-section of a pellet mill roll assembly including an example of a pellet mill roll temperature sensing system according to some aspects of the present disclosure.

FIG. 5 is a cross-section of a roll assembly 500 including an example of a roll temperature sensing system according to some aspects of the present disclosure. Referring to FIG. 5, a temperature sensor 510 may sense the temperature increase of the labyrinth seal 520 caused by the bearing 530. The heat transfer rate sensed by the exemplary temperature sensing system of the present disclosure may be calculated as:

K=thermal conductivity of SAE 660 bronze (pellet mill labyrinth seal)=58.2 W/m ° C.
A=28.83 in$^2$ (=0.0186 m$^2$)=area of bronze labyrinth seal
T1=482° F. (=250° C.)=wood flour ignition temperature from NFPA 499
T2=220° F. (=104° C.)=expected wood pelleting die cavity temperature
d=½ inch (=0.012 m)=thickness of labyrinth seal
HEAT TRANSFER RATE=(58.2)(0.0186) (250-104)/(0.012)=13,171 watts Exemplary embodiments in accordance with the present disclosure can provide more accurate and stable temperature readings than was previously thought possible. That is, the distance 'd' from the bearing to the temperature sensor is less when the temperature sensor is in contact with the bronze labyrinth seal versus in contact with the roll shaft. The exemplary embodiments can allow for a quicker response to bearing temperature changes, thereby permitting operators or control system to respond more quickly to increasing bearing temperatures.

When the thermal sensor 160 senses a temperature rise on the surface of the bronze labyrinth seal 150 a signal the thermal sensor 160 may be transferred through the wires 167 to the rear of the pellet mill main shaft 127. The signal may be displayed and/or transmitted to a remote location (e.g., a customer system) for readout and/or processing. In some implementations, an electrical slip ring may be mounted to the rear of the pellet mill main shaft, and the wires 167 may be connected to the rotational side of the slip ring.

The stationary side of the slip ring may be wired to a readout panel or further processed, for example, as a 4-20 mA signal to a computer configured to establish various parameters. For example, a sensed high temperature may trigger an alarm, an excessively high sensed temperature or a rapid change of temperature may trigger a shutdown of the pellet mill, etc.

Figure 6:
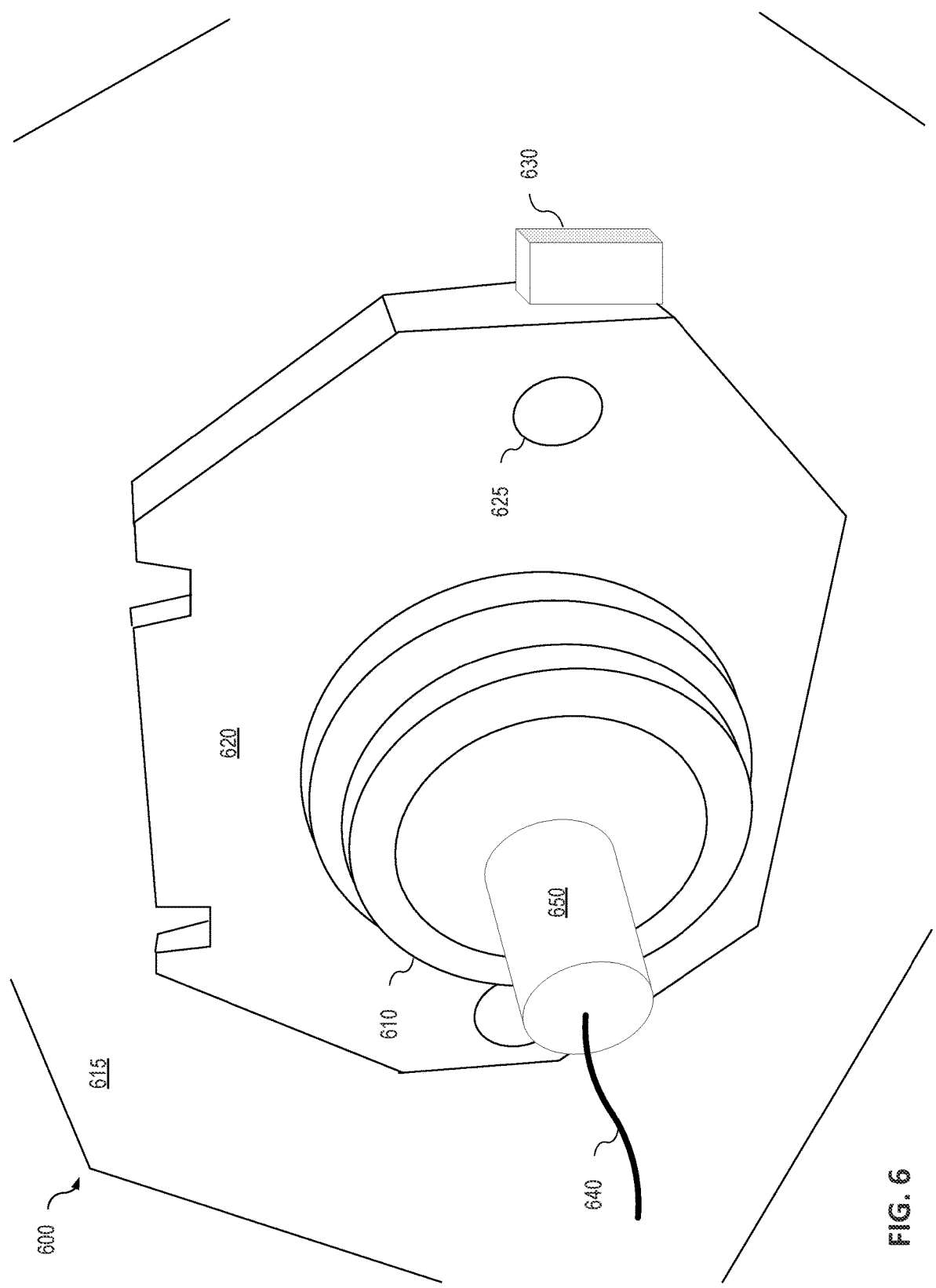
FIG. 6 is a diagram illustrating a slip ring arrangement for a pellet mill main shaft according to some aspects of the present disclosure.

FIG. 6 is a diagram illustrating a slip ring arrangement for a pellet mill main shaft according to some aspects of the present disclosure. Referring to FIG. 6, the main shaft 610 of the pellet mill 600 may be a stationary shaft secured to a rear portion 615 of the pellet mill 600 by a plate 620 and shear pins 625. A slip ring assembly 650 may be coupled to the end of the main shaft 610 with the wires (e.g., the wires 167) connected to the rotational side of the slip ring assembly 650.

The wires may pass from the thermal sensors (e.g., the thermal sensors 160) through a hollow portion of the main shaft 610 running from a front portion of the main shaft in proximity to the temperature sensors to slip ring assembly 650 positioned at the back portions of the main shaft. In the event that the pellet mill assemblies (e.g., the pellet mill assemblies 125) and the rotating die jam, the shear pins 625 can shear off allowing the plate 620 to begin to rotate. As the plate 620 rotates, a proximity sensor 630 can cause power to be removed from the pellet mill 600, thereby preventing further damage. The slip ring assembly 650 can prevent damage to the wires connected to the temperature sensors in the event that the main shaft 610 rotates. Leads 640 may carry the temperature sensor signal from the slip ring assembly 650 to a controller, for example, but not limited to, a PLC or a computer.

In some implementations, a wireless transmitter may be used instead of a slip ring. The wireless transmitter may be a multiple channel temperature transmitter or multiple single channel temperature transmitters. Use of the wireless transmitter(s) may minimize the possibility of wire breakage. The wireless transmitter(s) may be mounted to the rear of the pellet mill main shaft. The wires 167 may extend from a hole in the main shaft and may connect to the wireless transmitter(s). The wireless transmitter(s) may transmit wireless signals to a remote receiver that may be connected to a gateway device. The gateway device may be connected to a readout panel for simple display or connected to a PLC programmed to establish various parameters.

The sensed temperature provided by exemplary embodiments of the roll temperature sensing system according to the present disclosure can provide real time information that may enable a pellet mill operator or an automated system to optimize operation and/or maintenance of the pellet mill. For example, the pellet mill roll temperature signal may be provided to a controller, for example, but not limited to, a PLC or other processor. The PLC or other processor may provide a notification to the pellet mill operator to add grease to the bearings when a predetermined bearing temperature has been reached. A grease system may provide grease to each roll assembly individually, thereby allowing the operator to control the flow of grease to each roll assembly and reduce grease usage while increasing bearing life. In some implementations, the PLC or other processor may activate an automatic lubrication system to provide grease to the roll assemblies based when the bearings achieve a predetermined temperature.

Figure 7:
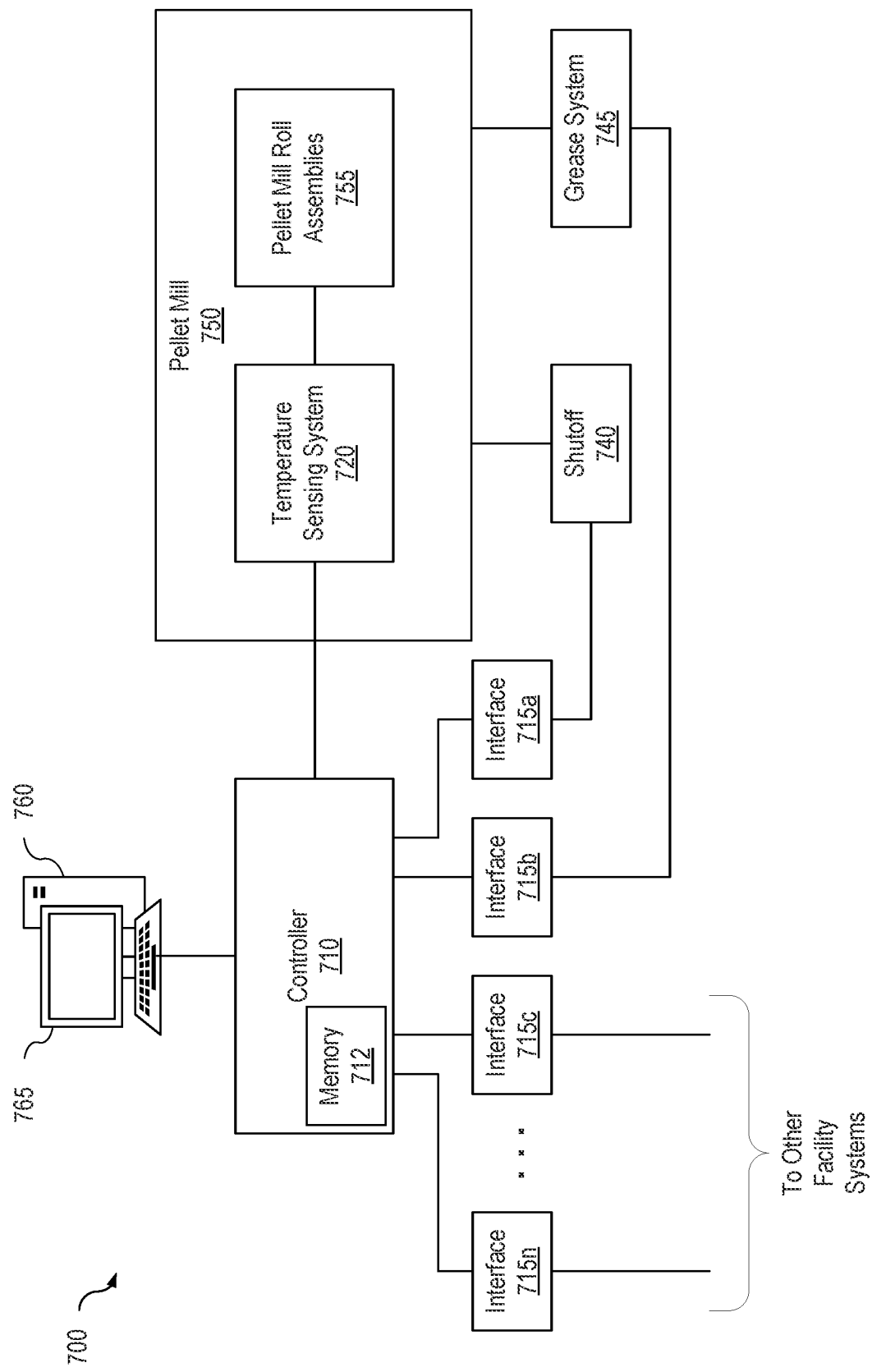
FIG. 7 is a block diagram illustrating an example of a control system including a roll temperature sensing system according to some aspects of the present disclosure.

FIG. 7 is a block diagram illustrating an example of a control system 700 including a roll temperature sensing system according to some aspects of the present disclosure. Referring to FIG. 7, the control system 700 may include a controller 710, one or more electrical interfaces 715a-715n, and a roll temperature sensing system 720. The controller 710 may be, for example, but not limited to, a PLC, a computer, a special purpose processor or programmable controller, or other programmable device. The controller 710 may be may be part of an automation system for the facility and may control other aspects of facility operations, for example, but not limited to, fluid (e.g., water, gasses, etc.) introductions systems for the pellet mill, feedstock feeders, etc., in addition to a pellet mill.

The controller 710 may include a memory 712. The memory 712 may be a storage device such as a solid state storage device or other storage device, and may be a combination of volatile and non-volatile storage or memory. In some implementations, portions of the memory 712 may be part of the controller 710. In some implementations, the memory 712 may be separate from the controller 710 and in communication with the controller 710. The memory 712 may be configured to store instructions executable by the controller 710, as well as data generated by the various sensors (e.g., the thermal sensor 160) of the pellet mill 750, and other applications executable by the controller 710.

The temperature sensing system 720 may include a roll assembly (e.g., the roll assembly 125) including a bearing (e.g., the bearing 142 shown in FIG. 2) and a bearing seal (e.g., the labyrinth seal 150 shown in FIG. 3), and a thermal sensor (e.g., the thermal sensor 160 shown in FIG. 3) in contact with the bearing seal. The temperature sensing system 720 may sense the bearing temperatures of the roll assemblies 755 via the thermal conductivity of the bearing seal.

Wiring from the thermal sensor may extend through a hollow core of a main shaft (e.g., the main shaft 127) of the pellet mill 750 via a slip ring to the controller 710. The controller 710 may interface with other facility systems, for example, supervisory control and data acquisition (SCADA) systems, distributed control systems (DCS), etc., and actuators, for example, shutoff switches, via one or more electrical interfaces 715a-715n. The electrical interfaces 715a-715n may be, for example, but not limited to, 4-20 mA interfaces, digital interfaces, or other input/output (I/O) modules. For example, the controller 710 may provide a shutoff signal via a first electrical interface 715a to a shutoff module 740 to shut off the pellet mill 750 when a high temperature is sensed for a roll assembly. As another example, the controller 710 may provide a signal to an automated grease system 745 via a second electrical interface 715b to provide grease to the bearings when an elevated temperature is sensed for a roll assembly.

As another example, a hollow centrifugal feeder shaft with a spray nozzle on the interior end and a rotary joint on the exterior end may be used to introduce liquids such as water or gases such as carbon dioxide directly into the pelleting cavity. The controller 710 may be programmed to control the spray nozzle via one of the electrical interfaces 715a-715n to introduce the liquid or gas by the spray nozzle when the pellet mill rolls reach a certain temperature.

Other actions may be taken via other interfaces based on monitoring of the bearing temperatures. For example, monitoring of the bearing temperatures can also at least in part determine:
  Pellet mill roll to die clearance (e.g., too much or too little)
  Application of grease as needed rather than a fixed interval of time
  Excessive roll assembly bearing clearance
  Roll sleeve wear
  Uneven feeding of material to the roll assemblies
Reacting to each of these items can decrease overall operating costs.

The controller 710 may also communicate with a computer 760 including a display device 765 to receive and display roll assembly temperatures. In some implementations, instructions executing on the computer 760 may interpret the roll assembly temperatures and suggest adjustments to an operating parameter of the pellet mill or suggest maintenance operation. An operator may perform actions based on the displayed suggestions. In some implementations, the instructions executing on the computer 760 may interpret the roll assembly temperatures and provide signals for initiating automated actions. The operator-performed actions and/or automated actions may include: Adding grease to the roll assembly bearing in question.
  Purging grease through roll assembly bearing in question.
  Adding water to the pellet mill die cavity.
  Adding water to the feedstock.
  Increasing the feed rate to pellet mill.
  Decreasing the feed rate to pellet mill.
  Triggering an alarm at a high roll assembly temperature and providing suggestions for an operator to:
    Check the roll to die clearance.
    Replace roll assemblies.
    Inspect pellet mill die cavity components.
    Review of feedstock parameters (moisture, fineness of grind, ingredients, tramp metal, etc.)
    Check temperature sensor connections.
    Shut down the pellet mill (and upstream equipment).
    Other specific suggestions as required.

The temperature sensing system 720 may include a clock (not shown) operable to generate a time base that may be used to correlate abnormal roll bearing assembly temperatures with other operational conditions, for example, but not limited to, amperage drawn by the motor of the pellet mill, feedstock rate, addition of grease to the roll bearing assemblies, etc. A time-coded history of pellet mill operational parameters may be created.

The controller 710 may be programmable to provide for further automation of the pelleting process where the temperature signals are translated into specific automated actions. The controller 710 may be programmable to cause the roll bearing assembly temperatures to be checked at programmable time intervals. The controller 710 may disable temperature sensing during idle periods of the pellet mill to prevent skewing of the temperature data. The controller 710 may be programmable to process roll assembly temperature readings, including implementing programmable filtering, for example, to provide temperature averages and/or remove temperature spikes.

The controller 710 may be programmable to implement programmable time delays and/or programmable temperature thresholds to permit pellet mill operations to stabilize prior to notifying of error conditions. For example, during start-up of a pellet mill, the pellet mill roll bearing temperature may be expected to increase rapidly and does not indicate a fault. A time delay or a temperature threshold may be programmed to prevent the system from generating a notification of the rapid temperature increase during start-up.

The controller 710 may be programmed to monitor aspects of the roll assembly temperatures that may indicate potential problems affecting pellet mill operations. The controller may monitor absolute temperature of the roll assemblies. The controller may be programmed to react (e.g., generate an alarm or other notification) based on a roll assembly reaching a programmed high temperature. The controller may analyze the roll assembly temperature readings to determine a slope of a graph of roll assembly temperature versus time curve. The controller may be programmed to react to a graph having a steep slope indicating a quickly rising roll assembly temperature. The controller may analyze the roll assembly temperature readings to determine average roll assembly temperatures over different periods of time. The periods of time for averaging may be programmable, and the controller may compare roll assembly temperature averages for different periods of time. For example, the controller may determine roll assembly temperature averages for a period of two hours and for a period of 24 hours. The two-hour average may be compared to the 24-hour average. A threshold value may be specified to determine an unacceptable difference between the averages.

The computer 760 may cause the display device 765 to display any roll assembly temperature condition being acted upon, an action being taken as a result of the temperature condition, and prior actions taken as well as a response of the roll assembly temperature to the prior actions. In addition, the computer 760 may cause the display device 765 to display current and/or historical roll temperature data, for example, but not limited to, average temperatures, temperature graphs, etc.

FIG. 8 is a spreadsheet showing examples of possible actions that may be taken based on detected temperature conditions according to some aspects of the present disclosure. In some implementations, the controller may be programmed to implement the possible actions. In some implementations, the actions may be performed by an operator. In some implementations, the controller may be programmed to implement some of the actions while an operator may perform other actions. The spreadsheet of FIG. 8 is exemplary and other temperature conditions may be detected and/or other actions implemented without departing from the scope of the present disclosure.

Referring to FIG. 8, for each detected temperature condition in the first column, possible actions in the corresponding rows are numbered in a suggested order of performing the action. As used in FIG. 8, "reaching a high temperature" means exceeding a specified temperature threshold that may be programmed into the controller. After performing each action, the roll temperature may be re-analyzed before proceeding to the next reaction. In each case, the last possible action to be performed based on the detected temperature condition is to trigger an alarm. The alarm may be, for example, an audio alarm such as a horn or a siren, a visual alarm such as a flashing light or a notification on a display screen, or a combination of audio and visual alarms. Other alarms and/or notifications may be implemented without departing from the scope of the present disclosure.

An alarm may be an indication that an operator should perform further action. Referring again to FIG. 8, suggested actions to be performed by an operator when an alarm is triggered corresponding to each of the detected temperature conditions are shown to the right of the "Trigger Alarm" column. The possible actions and suggested action when an alarm is triggered corresponding to the detected temperature conditions are described further below. The controller may be programmed to perform the possible actions while the suggested actions may be performed an operator.

When the controller detects that one roll assembly reaches a high temperature, the controller may: 1) add grease to the roll assembly and re-analyze the roll assembly temperature after a pre-programmed time; 2) if the grease does not lower the temperature below a threshold temperature, purge the grease (e.g., replace all grease) through the roll assembly. The quantity of grease for purging to may be pre-programmed into the controller; 3) if purging the grease in the roll assembly does not lower the temperature below the threshold temperature, trigger the alarm. When the alarm is triggered, the controller may suggest, for example, via the display device 765 actions to be performed by an operator, including resetting the roll-to-die clearance, replacing the roll assembly, and/or inspecting the components in the die cavity.

The controller may detect that one roll assembly changes temperature rapidly, for example, by determining that a slope of a temperature vs. time graph exceeds a preprogrammed threshold value. When the controller detects that one roll assembly changes temperature rapidly, the controller may: 1) purge grease through the roll assembly; 2) if purging the grease in the roll assembly does not lower the temperature below the threshold temperature, trigger the alarm. When the alarm is triggered, the controller may suggest, for example, via the display device 765 actions to be performed by an operator, including replacing the roll assembly, inspecting the components in the die cavity, and/or shutting down the pellet mill. A preprogrammed maximum over-temperature reading may cause the controller to automatically shut down the pellet mill without pellet mill operator interaction in cases where an operator is not able to shut down the system.

When the controller detects that one roll assembly reaches a high temperature, the controller may: 1) add grease to the roll assembly; 2) if grease does not lower the temperature below a threshold temperature, decrease or cut off the feed rate to the pellet mill; 3) if the temperature does not decrease below a threshold temperature, add water to the feedstock based on a recorded pellet temperature and a change in pellet temperature over time; 4) if adding water to the feedstock does not decrease the roll assembly temperature below the threshold temperature, purge the grease through the roll assemblies; 5) if purging the grease in the roll assembly does not lower the temperature below the threshold temperature, trigger an alarm. When the alarm is triggered, the controller may suggest, for example, via the display device 765 actions to be performed by an operator, including resetting roll-to-die clearance, inspecting the components in the die cavity, reviewing the feedstock parameters, checking the temperature sensor connections, and/or shutting down the pellet mill.

To avoid triggering alarms resulting from the normal rapid temperature rises during start-up, the controller may be programmable to wait for a preprogrammed time period or to reach a programmed temperature threshold before triggering an alarm due to a rapid temperature increase. When the controller detects that all roll assemblies change temperature rapidly, the controller may: 1) purge the grease through each roll assembly and decrease or cut off the feed rate to the pellet mill; 3) if the temperature does not decrease below a threshold temperature, add water to the feedstock; 4) if adding water to the feedstock does not decrease the roll assembly temperature below the threshold temperature, trigger an alarm. When the alarm is triggered, the controller may suggest, for example, via the display device 765 actions to be performed by an operator, including inspecting the components in the die cavity, reviewing the feedstock parameters, and/or shutting down the pellet mill. A preprogrammed maximum over-temperature reading may cause the controller to automatically shut down the pellet mill without pellet mill operator interaction in cases where an operator is not able to shut down the system.

When the controller detects that the temperature of one roll assembly decreases slowly, the controller may: 1) trigger an alarm. When the alarm is triggered, the controller may suggest, for example, via the display device 765 actions to be performed by an operator, including checking the pelleting rate (e.g., has feed been removed), checking the roll-to-die clearance, inspecting the components in the die cavity, checking temperature sensor connections, checking for corresponding temperature decrease in the other roll assemblies, and/or comparing the temperature decrease with the current drawn by the motor of the pellet mill; 2) increase the pelleting rate.

When the controller detects that the temperature of one roll assembly decreases suddenly, the controller may: 1) trigger an alarm. When the alarm is triggered, the controller may suggest, for example, via the display device 765 actions to be performed by an operator, including checking the pelleting rate (e.g., has feed been removed), checking roll-to-die clearance, inspecting the components in the die cavity, checking temperature sensor connections, checking for corresponding temperature decrease in the other roll assemblies, and/or comparing the temperature decrease with the current drawn by the motor of the pellet mill; 2) increase the pelleting rate.

When the controller detects that the roll assembly temperature and pellet mill motor current climb above normal (as compared to operational history), the controller may: 1) purge the grease through the roll assemblies; 2) if purging the grease in the roll assembly does not lower the temperature below the threshold temperature, decrease the feed rate to maintain a steady current draw for the motor; 3) if the temperature does not decrease below the threshold temperature, add water to the feedstock and trigger an alarm. When the alarm is triggered, the controller may suggest, for example, via the display device 765 actions to be performed by an operator, including checking the roll-to-die clearance and/or reviewing the feedstock parameters. In different implementations, the controller may be programmed to suggest different actions to be performed.

To prevent actions from being taken prematurely, for example, while the system is starting and both the roll assembly temperature and the current drawn by the pellet mill motor are rising together, a threshold temperature may be preprogrammed in the controller, above which these conditions will be analyzed.

In some cases, the controller may detect a specified difference (e.g., ten percent or another value) between the temperatures of the roll assemblies. The specified difference may be a programmable value. When the controller detects a specified difference between the temperatures of the roll assemblies, the controller may: 1) trigger an alarm. When the alarm is triggered, the controller may suggest, for example, via the display device 765 actions to be performed by an operator, including checking the roll-to-die clearance, replacing the roll assembly, inspecting the components in the die cavity (e.g., centri-feeder shaft, feed plow, etc.), and/or checking the temperature sensor connections.

When the controller detects that a roll assembly temperature reaches a value higher than the feedstock ignition temperature, the controller may simultaneously: shut down the feedstock and the pellet mill, add water to the die cavity, and trigger an alarm. When the alarm is triggered, the controller may suggest, for example, via the display device 765 actions to be performed by an operator, including purging the grease through each roll assembly, replacing the roll assemblies, inspecting the components in the die cavity, reviewing the feedstock parameters, and/or checking the temperature sensor connections. The controller may be programmed with the feedstock ignition temperature value.

The controller may analyze the roll assembly temperature readings to determine average roll assembly temperatures over different periods of time. The periods of time for averaging may be programmable, and the controller may compare roll assembly temperature averages for different periods of time. When the controller determines that the average temperature of one roll assembly over a shorter period of time is greater than the average temperature of one roll assembly over an extended period of time, the controller may 1) add grease to the roll assembly; 2) purge the grease through roll assembly; 3) trigger an alarm. When the alarm is triggered, the controller may suggest, for example, via the display device 765 actions to be performed by an operator, including performing a visual check of grease purging on the roll assembly, checking the roll-to-die clearance, replacing the roll assembly, and/or inspecting the components in the die cavity.

The controller may analyze the roll assembly temperature readings to determine average roll assembly temperatures over different periods of time. The periods of time for averaging may be programmable, and the controller may compare roll assembly temperature averages for different periods of time. When the controller determines that the average temperature of all roll assemblies over a shorter period of time is greater than the average temperature of all roll assemblies over an extended period of time, the controller may 1) add grease to the roll assemblies; 2) purge the grease through the roll assemblies; 3) decrease the feed rate; 4) trigger an alarm. When the alarm is triggered, the controller may suggest, for example, via the display device 765 actions to be performed by an operator, including performing a visual check of grease purging on the roll assemblies, checking the roll-to-die clearance for the roll assemblies, inspecting the components in the die cavity, and/or reviewing the feed stock parameters.

While the operations explained above are described primarily as being performed by the controller (e.g., the controller 710), the operations may also be performed by a computer (e.g., the computer 760), or by a combination of the controller and the computer without departing from the scope of the present disclosure.

Figure 9:
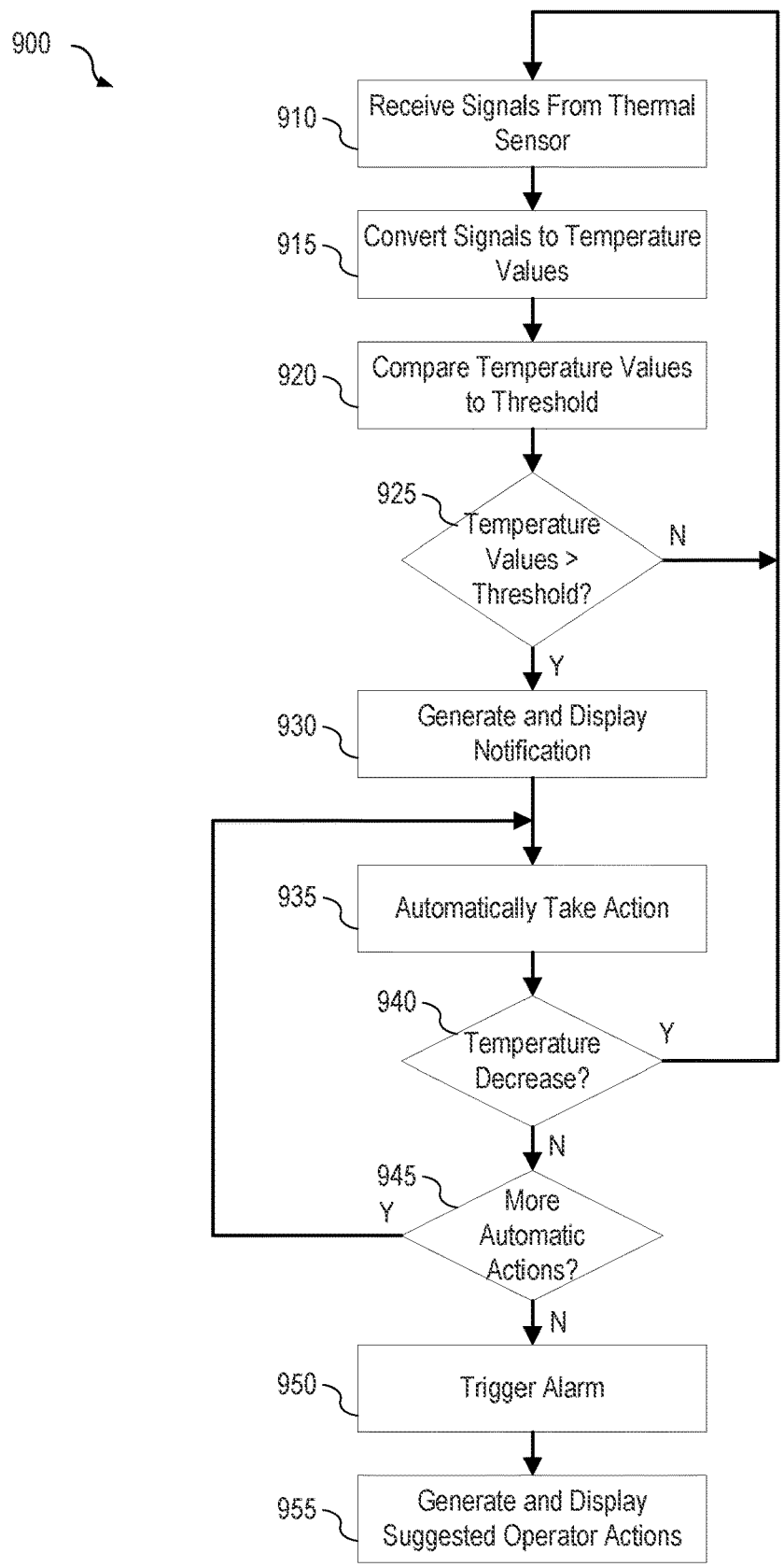
FIG. 9 is a flowchart illustrating a method for roll assembly temperature sensing for a pellet mill according to some aspects of the present disclosure.

FIG. 9 is a flowchart illustrating a method 900 for roll assembly temperature sensing for a pellet mill according to some aspects of the present disclosure. Referring to FIG. 9, at block 910, signal may be received from the thermal sensor. The controller should would rather have them, may receive temperature signals for the roll assembly from the thermal sensor. The thermal sensor may be in thermal contact (e.g., via the spring-loaded thermowell) with a bearing seal (e.g., the seal 150). The bearing seal may be thermally conductive and may conduct heat generated by the bearing (e.g., the bearing 142) to the thermal sensor.

At block 915, the temperature signals may be converted to temperature values. The controller may convert the received temperature signals to temperature values that can be evaluated. The controller may convert the temperature signals to values including absolute temperature values, filtered temperature values, temperature versus time curves, or temperature versus time curve slopes. Other conversions may be performed without departing from the scope of the present disclosure.

At block 920, the temperature values may be compared to a threshold. The controller may compare the temperature values to a threshold corresponding to the type of converted temperature value. For example, if the temperature signals are converted to absolute temperature values, the values may be compared to an absolute temperature threshold. If the temperature signals are converted to temperature versus time curve slopes, the slopes may be compared to threshold slope values.

At block 925, it may be determined whether the temperature values for the roll assembly exceed a threshold. The controller may determine whether the temperature values obtained from the temperature signals exceed the corresponding threshold. In response to determining that the temperature values do not exceed a threshold (925-N), the method may continue at block 910 to receive signals from the thermal sensor.

In response to determining that the temperature values exceed a threshold (925-Y), at block 930, a notification may be generated. The controller may cause a notification to be displayed on a display device visible to an operator.

At block 935, an action may be automatically taken. The controller may automatically cause a maintenance action to be performed. For example, the controller may automatically cause additional grease to be applied to the roller assembly bearings by an automated grease system by communicating with the automated grease system via one of the electrical interfaces 715a-715n. FIG. 8 illustrates examples of operations that may be automatically initiated by the controller.

At block 940, it may be determined whether the temperature has decreased. The controller may continue to receive and convert the temperature signals from the thermal sensor for a specified period of time to determine whether the temperature of the roll assembly has decreased. In response to determining that the temperature of the roll assembly has decreased (940-Y), the method may continue the method may continue at block 910 to receive signals from the thermal sensor.

In response to determining that the temperature of the roll assembly has not decreased (940-N), at block 945, it may be determined whether more automatic actions may be performed. The controller may determine whether additional actions may be performed that may decrease the temperature of the roll assembly.

In response to determining that more automatic actions may be performed (945-Y), the method may continue to automatically take actions at block 935. For example, the controller may automatically decrease the feedstock rate. It should be appreciated that the noted actions are merely exemplary and other actions may be performed without departing from the scope of the present disclosure.

In response to determining that no more automatic actions may be performed (945-N), at block 950, an alarm may be triggered. When the controller determines that no further automatic actions can be performed and the roll assembly temperature has not decreased, the controller may trigger an alarm to alert an operator. The alarm may include a visible indication on a display device of a computer and an description of the alarm. In some implementations, the alarm may alternatively or additionally include an audio indicator such as a siren and/or a visual indicator such as a flashing light.

At block 955, suggested operator actions may be generated and displayed. The controller may cause the display device to generate suggested operator actions corresponding to the conditions causing the elevated temperature conditions. The suggested operator actions are actions that should be performed by an operator rather than operations that could be initiated automatically by the controller. FIG. 8 illustrates examples of suggested operator actions that may be performed by an operator after an alarm is triggered.

The specific operations illustrated in FIG. 9 provide a particular method for roll assembly temperature sensing for a pellet mill according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 9 may include multiple sub-operations that may be performed in various sequences as appropriate to the individual operation. Furthermore, additional operations may be added or removed depending on the particular applications.

The method 900 may be embodied on a non-transitory computer readable medium, for example, but not limited to, the memory 712 or other non-transitory computer readable medium known to those of skill in the art, having stored therein a program including computer executable instructions for making a processor, computer, or other programmable device execute the operations of the method.

While aspects of the inventive concept have been particularly shown and described with references to exemplary embodiments thereof, it will be understood by those skilled in the art that various changes in form and details may be made therein without departing from the scope of protection encompassed by the appended claims.

What is claimed is:

1. A roll assembly temperature sensing system for a pellet mill,
   the roll assembly temperature sensing system comprising:
   a thermal sensor; and
   a pellet mill roll assembly rotatably disposed in a rotor assembly,
   wherein the pellet mill roll assembly comprises:
      a roll shaft;
      a bearing disposed circumferentially around the roll shaft; and
      a seal disposed between an end of the bearing and the rotor assembly,
   wherein the rotor assembly comprises an area defining a die cavity adjacent to the seal, wherein the thermal sensor is disposed within a spring-loaded thermowell assembly that is disposed within the die cavity, wherein a distal end of the spring-loaded thermowell assembly is configured to engage the seal, and wherein the thermal sensor is configured to detect a temperature of the seal resulting from heat conducted from the bearing.

2. The roll assembly temperature sensing system of claim 1, wherein the thermal sensor is in electrical communication with a control system configured to control operation of the pellet mill based on the temperature of the seal detected by the thermal sensor.

3. The roll assembly temperature sensing system of claim 2, wherein the thermal sensor is in electrical communication with the control system via a slip ring assembly, the slip ring assembly being mounted to an opposite end of the pellet mill from the rotor assembly, the slip ring assembly being in electrical communication with the thermal sensor by wiring extending through a hollow portion of a main shaft of the pellet mill.

4. The roll assembly temperature sensing system of claim 2, wherein the thermal sensor is in electrical communication with the control system via a wireless transmitter, the wireless transmitter being mounted to an opposite end of the pellet mill from the rotor assembly, the wireless transmitter being in electrical communication with the thermal sensor by wiring extending through a hollow portion of a main shaft of the pellet mill.

5. The roll assembly temperature sensing system of claim 2, wherein the control system is configured to receive signals from the thermal sensor, convert the signals to temperature values, and based on the temperature values, automatically initiate an action affecting operation of the pellet mill.

6. The roll assembly temperature sensing system of claim 5, wherein converting the signals to temperature values comprises generating an absolute temperature value, filtering temperature values, generating a temperature versus time curve, or generating a slope of a temperature versus time curve.

7. The roll assembly temperature sensing system of claim 2, wherein the control system is configured to receive a signal from the thermal sensor, convert the signal to a temperature value, and based on the temperature value generate a notification to an operator.

8. The roll assembly temperature sensing system of claim 1, wherein the seal is a brass seal.

9. The roll assembly temperature sensing system of claim 1, wherein the thermal sensor is a resistance temperature detector.

10. A temperature sensing system, comprising:
a rotor assembly disposed in a milling chamber of a pellet mill, the rotor assembly comprising:
a cavity configured to accommodate a spring-loaded thermowell assembly; and
a portion configured to accommodate a roll assembly configured to rotate within the milling chamber, the roll assembly comprising:
a pellet mill roll;
a bearing configured to support the pellet mill roll on a roll shaft; and
a seal disposed between the bearing and the portion of the rotor assembly configured to accommodate a roll assembly; and
a thermal sensor disposed within the spring-loaded thermowell assembly, wherein the spring-loaded thermowell assembly is configured to engage the seal, and wherein the thermal sensor is configured to detect a temperature of the seal resulting from heat conducted from the bearing.

11. The temperature sensing system of claim 10, wherein the thermal sensor is disposed within the spring-loaded thermowell assembly, and the spring-loaded thermowell assembly is configured to engage the seal.

12. The temperature sensing system of claim 10, wherein the thermal sensor is in electrical communication with a control system comprising:
a controller;
one or more electrical interfaces configured to electrically communicate with the thermal sensor, wherein the controller is configured to:
receive signals from the thermal sensor;
convert the signals to temperature values; and
based on the temperature values exceeding a threshold value, automatically initiate one or more actions affecting operation of the pellet mill via the one or more electrical interfaces.

13. The temperature sensing system of claim 12, wherein converting the signals to temperature values comprises generating an absolute temperature value, filtering temperature values, generating a temperature versus time curve, or generating a slope of a temperature versus time curve.

14. The temperature sensing system of claim 12, wherein the control system further comprises a display device, and wherein the controller is further configured to generate a based on temperature values exceeding the threshold value, and to cause the display device to display a notification to an operator.

15. The temperature sensing system of claim 14, wherein the controller is further configured to trigger an alarm when the temperature values exceed the threshold value, and to cause the display device to display one or more actions to be performed by the operator.

16. A method for sensing a temperature of a roll assembly for a pellet mill including a roll assembly temperature sensing system, the roll assembly temperature sensing system comprising: a thermal sensor; and the roll assembly rotatably disposed in a rotor assembly, wherein the roll assembly comprises: a roll shaft; a bearing disposed circumferentially around the roll shaft; and a seal disposed between an end of the bearing and the rotor assembly, wherein the rotor assembly comprises an area defining a die cavity adjacent to the seal, wherein the thermal sensor is disposed within a spring-loaded thermowell assembly that is disposed within the die cavity, wherein a distal end of the spring-loaded thermowell assembly is configured to engage the seal, and wherein the thermal sensor is configured to detect a temperature of the seal resulting from heat conducted from the bearing, the method comprising: receiving, by a controller, signals from the thermal sensor disposed in the die cavity in the rotor assembly of the pellet mill, wherein the thermal sensor senses a temperature of the seal in contact with the bearing of the roll assembly; converting the signals to temperature values, comparing the temperature values to a threshold value; and in response to determining that the temperature values exceed the threshold value, generating, by the controller, a notification on a display device, and automatically performing an operation intended to decrease the temperature value.

17. The method of claim 16, wherein converting the signals to temperature values comprises generating an absolute temperature value, filtering temperature values, generating a temperature versus time curve, or generating a slope of a temperature versus time curve.

18. The method of claim 16, further comprising instruction for performing
operations including:
in response to determining that the temperature values do not decrease after performing the operation, triggering an alarm.

19. The method of claim 16, further comprising instructions for performing operations including:
displaying on the display device one or more actions to be performed by an operator.

* * * * *